(12) United States Patent
Moretti et al.

(10) Patent No.: US 11,084,527 B2
(45) Date of Patent: Aug. 10, 2021

(54) METHOD FOR SUPERVISING THE OPERATION OF A POWER STEERING SYSTEM

(71) Applicant: JTEKT EUROPE, Irigny (FR)

(72) Inventors: Romain Moretti, Thurins (FR); Tahar Slama, Ecully (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/772,935

(22) PCT Filed: Dec. 11, 2018

(86) PCT No.: PCT/FR2018/053195
§ 371 (c)(1),
(2) Date: Jun. 15, 2020

(87) PCT Pub. No.: WO2019/115927
PCT Pub. Date: Jun. 20, 2019

(65) Prior Publication Data
US 2020/0361529 A1    Nov. 19, 2020

(30) Foreign Application Priority Data

Dec. 15, 2017  (FR) ..................................... 17/62252

(51) Int. Cl.
| | |
|---|---|
| *B62D 5/00* | (2006.01) |
| *B62D 5/04* | (2006.01) |
| *B60W 50/04* | (2006.01) |
| *B60W 50/00* | (2006.01) |
| *B62D 6/00* | (2006.01) |

(52) U.S. Cl.
CPC ........... *B62D 5/0493* (2013.01); *B60W 50/04* (2013.01); *B62D 5/0463* (2013.01); *B60W 2050/0043* (2013.01); *B60W 2510/20* (2013.01); *B62D 6/008* (2013.01)

(58) Field of Classification Search
USPC ................................................ 701/36, 41–44
See application file for complete search history.

(56) References Cited

U.S. PATENT DOCUMENTS

| | | | |
|---|---|---|---|
| 6,195,601 B1 * | 2/2001 | Spillner ................. | B62D 5/065 180/422 |
| 7,954,593 B2 * | 6/2011 | Dornhege ............ | B62D 5/0472 180/446 |

(Continued)

FOREIGN PATENT DOCUMENTS

| | | |
|---|---|---|
| DE | 102010043915 A1 | 5/2012 |
| JP | 2007-030678 A | 2/2007 |

OTHER PUBLICATIONS

Apr. 18, 2019 International Search Report issued in International Patent Application No. PCT/FR2018/053195.

*Primary Examiner* — Jonathan L Sample
(74) *Attorney, Agent, or Firm* — Oliff PLC

(57) ABSTRACT

Method for monitoring the operation of a power steering system including a steering wheel, a servo motor and a monitoring module, characterized in that said method involves a step of determining at least one temporary limit value of a parameter, a step of estimating an additional value which an assistance functionality contributes to a setpoint value of the parameter, and a step of correcting the at least one temporary limit value by the additional value.

8 Claims, 3 Drawing Sheets

(56) References Cited

U.S. PATENT DOCUMENTS

| | | | |
|---|---|---|---|
| 2008/0097669 A1* | 4/2008 | Kasbarian | B62D 6/10 |
| | | | 701/42 |
| 2009/0259365 A1* | 10/2009 | Rohlfs | B62D 15/028 |
| | | | 701/41 |
| 2011/0035110 A1* | 2/2011 | Cassar | B62D 6/008 |
| | | | 701/42 |
| 2012/0179333 A1* | 7/2012 | Thomys | B62D 15/025 |
| | | | 701/41 |
| 2013/0245893 A1* | 9/2013 | Sprinzl | B62D 5/0463 |
| | | | 701/42 |
| 2015/0217807 A1* | 8/2015 | Schumacher | B60W 30/14 |
| | | | 701/41 |
| 2015/0284023 A1* | 10/2015 | Lengrais | B62D 6/10 |
| | | | 701/41 |
| 2017/0015349 A1* | 1/2017 | Bourdrez | B62D 5/0463 |
| 2017/0015350 A1* | 1/2017 | Bourdrez | B62D 6/08 |
| 2017/0106903 A1* | 4/2017 | Moretti | B62D 15/0285 |
| 2017/0282972 A1* | 10/2017 | Moretti | B60W 50/04 |
| 2018/0134309 A1* | 5/2018 | Moulaire | B62D 6/10 |
| 2018/0304917 A1* | 10/2018 | Michelis | B62D 5/0472 |

\* cited by examiner

METHOD FOR SUPERVISING THE OPERATION OF A POWER STEERING SYSTEM

The invention concerns the field of the power steering systems of a vehicle and more particularly a method for supervising the operation of a power steering system.

The purpose of a steering system of a vehicle is to allow a driver to monitor a vehicle trajectory by exerting a force on a steering wheel.

An electric power steering system of a vehicle uses an assist motor, controlled by a steering computer, in order to reduce the forces to be provided by the driver on the steering wheel to turn the vehicle wheels.

In a normal situation, the force exerted on the steering wheel, that is to say the steering wheel torque, by the driver causes a setpoint assist force, that is to say a setpoint motor torque, which will be exerted by the assist motor, generally in a direction identical to a direction of the steering wheel torque, so as to turn the wheels in the direction desired by the driver. The steering wheel torque and the setpoint motor torque are generally exerted in the same direction.

For example, by determining that the positive direction corresponds to a «turning the wheels to the right» action, when the driver turns the steering wheel in the positive direction, he exerts a positive steering wheel torque which causes a positive setpoint motor torque allowing turning the wheels of the vehicle to the right.

The power steering system, by its action on the trajectory of the vehicle, has a decisive role in the safety of the occupants of the vehicle.

Thus, legislation require that the proper operation of said power steering system is constantly monitored. That is to say that a setpoint value of a parameter is consistent with an input signal in normal situation. For example, the setpoint value can be the setpoint motor torque and the input signal can be the steering wheel torque.

The supervision of the proper operation, in normal situation, is carried out by a supervising module and a comparison module. The supervising module is operating continuously, and determines at least one limit value of the setpoint value of the parameter. The comparison module is operating continuously, and compares the setpoint value of the parameter to the at least one limit value.

When the power steering system is operating correctly, the setpoint value is consistent with the at least one limit value. It is thus possible to detect the proper operation or, on the contrary, a failure of the power steering system.

For example, the supervision of the proper operation may consist in checking that the setpoint motor torque has a value consistent with a maximum limit value and a minimum limit value which are determined by the supervising module depending on the steering wheel torque. The maximum limit value and the minimum limit value allow, among others, ensuring that the setpoint motor torque and the steering wheel torque are in the same direction.

Moreover, there are assistance functions integrated into the vehicles, such as driving assistance (ADAS), allowing occasionally controlling the power steering system so as, for example, to encourage the driver to correct his action in the case of a dangerous situation such as an over-turn or an under-turn, or when crossing a white line, to control the vehicle so as to keep it between two white lines or to maneuver the vehicle during a parking.

The assistance functionalities interfere with a normal regulation of the power steering system so as to at least modify the setpoint value of the parameter. The setpoint value is then no longer consistent with the input signal. For example, when the assistance functionality is active, the setpoint motor torque can be in a different direction from the steering wheel torque.

Thus, the assistance functionalities interfere with the supervising module which determines a limit value which is not consistent with the setpoint value.

One solution allowing avoiding inconsistencies is to degrade the supervision carried out by the supervising module in normal situation by modifying the limit values of the parameter which are determined by the supervising module.

For example, one solution consists in modifying the maximum limit value and the minimum limit value of the setpoint motor torque depending on the steering wheel torque. This solution has the drawback of degrading the supervision performed by the supervising module in the absence of an assistance functionality.

A compromise should then be made between false detections of failures of the power steering system and a degradation of the performed supervision.

The invention aims at overcoming all or part of the aforementioned drawbacks by ensuring a method for supervising the operation of a power steering system comprising a steering wheel, an assist motor and a supervising module characterized in that it comprises:
- a step of determining at least one temporary limit value of a parameter;
- a step of estimating an additional value provided by an assistance functionality to a setpoint value of the parameter;
- a step of correcting the at least one temporary limit value by the additional value.

The power steering system, via a steering computer, determines the setpoint value of a parameter which depends on at least one input signal, or an assistance functionality when an assistance function is applied on the power steering system.

The supervising module determines, during the determination step, at least one temporary limit value corresponding to the at least one limit value determined in the absence of the application of the assistance functionality.

Thus, the supervising module is operating identically whether an assistance functionality is active or inactive. There is no degradation of the supervision carried out by the supervising module when the assistance functionality is inactive.

However, in order to take into account an influence of the assistance functionality on the setpoint value, the method estimates the additional value provided by the assistance functionality to the setpoint value. That is to say, the influence of the assistance functionality on the setpoint value. The setpoint value then corresponds to the sum of the additional value and the setpoint value determined in the absence of the application of the assistance functionality.

Finally, the method corrects the at least one temporary limit value by the additional value so as to determine the at least one limit value of the parameter.

Thus, the method according to the invention allows determining at least one limit value of the parameter taking into account an influence of the assistance functionality on the setpoint value, without modifying the supervision when the assistance functionality is not active.

The power steering system will be declared faulty when the setpoint value is not consistent with the limit value.

According to one feature of the invention, the determination step defines a temporary maximum limit value and a temporary minimum limit value of the parameter.

Thus, in the absence of an assistance functionality and when the power steering system is operating correctly, the setpoint value of the parameter should be comprised between the temporary maximum limit value and the temporary minimum limit value.

According to one feature of the invention, the estimation step calculates the additional value using a first transfer function between the setpoint value and an assistance function of the assistance functionality.

The assistance function represents the influence of the assistance functionality on the steering computer.

A mathematical relationship is established between the setpoint value of the parameter and the assistance function of the assistance functionality.

According to one feature of the invention, the correction step adds the additional value to a temporary limit value of the parameter.

Thus the sum of the additional value and the temporary limit value is equal to a limit value of the parameter.

When the assistance functionality is inactive, the additional value is equal to 0, and the temporary limit value is equal to a limit value of the parameter.

The limit value of the parameter is consistent with the setpoint value when the power steering system is operating correctly, and when the assistance functionality is active or inactive.

According to one feature of the invention, the method comprises a step of calculating a supplementary value provided by the assistance functionality to a modified input signal of the supervising module.

The assistance functionality may interfere with the power steering system by modifying the setpoint value of the parameter but also by modifying at least one input signal of the steering computer, which will be called modified input signal in the following description.

When this is the case, the input signal of the supervising module is also modified by the assistance functionality. The input signal of the supervising module becomes equal to the modified input signal.

The assistance functionality can influence several input signals.

The method calculates the supplementary value provided by the assistance functionality to the modified input signal. That is to say, the influence of the assistance functionality on the modified input signal.

According to one feature of the invention, the calculation step determines the supplementary value using a second transfer function between the modified input signal and the assistance function of the assistance functionality.

Thus a mathematical relationship is established between each modified input signal and the assistance function of the assistance functionality.

According to one feature of the invention, the first and/or the second transfer function(s) is/are identified by a theoretical equation.

According to one feature of the invention, the first and/or the second transfer function(s) is/are identified empirically using at least one simulation and/or at least one experiment.

According to one feature of the invention, the method comprises a step of modifying the modified input signal by the supplementary value.

The method takes into account the influence of the assistance functionality on the modified input signal by defining the input signal of the supervising module as a combination of the supplementary value and the modified input signal.

Thus, the input signal of the supervising module is not influenced by an assistance functionality whether it is active or inactive.

The supervising module determines temporary limit values which are not influenced by the assistance functionality based on this input signal which is not influenced by the assistance functionality.

According to one feature of the invention, the modification step subtracts the supplementary value from the modified input signal.

Thus the input signal is a subtraction of the supplementary value and the modified input signal so as to remove the influence of the assistance functionality from the modified input signal.

The invention will be better understood, thanks to the description below, which relates to an embodiment according to the present invention, given by way of non-limiting example and explained with reference to the appended schematic drawings, in which.

Figure 1:
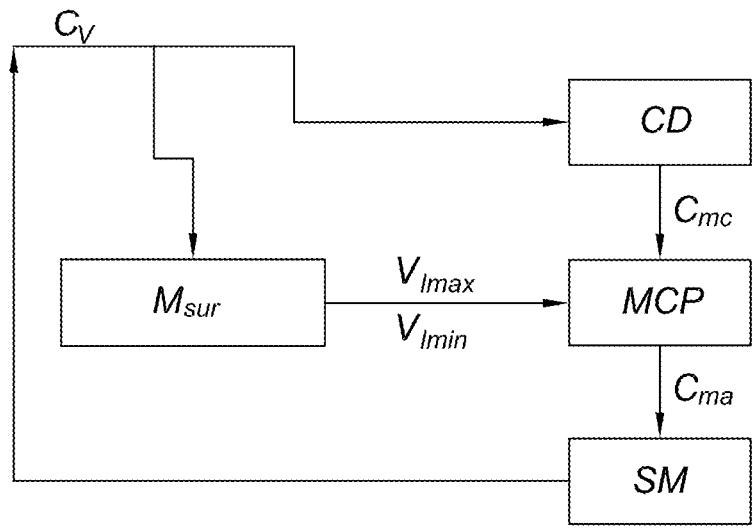
FIG. 1 is a schematic representation of a normal operation of a power steering system.

In a normal operation of a power steering, a regulation loop regulates an applied motor torque $C_{ma}$ depending on a steering wheel torque $C_v$ exerted by a driver on a steering wheel of a vehicle in order to determine a trajectory of said vehicle. As shown in FIG. 1, a steering computer CD determines a setpoint motor torque $C_{mc}$, which is equal, in the absence of failure, to the applied motor torque $C_{ma}$ on a mechanical system SM comprising at least one assist motor, in order to assist the driver in his intention to turn. The regulation loop influences the steering wheel torque $C_v$ the applied motor torque $C_{ma}$ and vice versa.

Legislation require ensuring the safety of the driver and the integrity of the vehicle in the case of failure of the steering computer CD, that is to say when the setpoint motor torque $C_{mc}$ becomes inconsistent relative to the steering wheel torque $C_v$. Thus, for example, it is determined that the applied motor torque $C_{ma}$ should always, in normal operation, have a value related to the exerted steering wheel torque $C_v$.

This condition is checked by a supervising module $M_{sur}$ and by a comparison module MCP.

Figure 2:
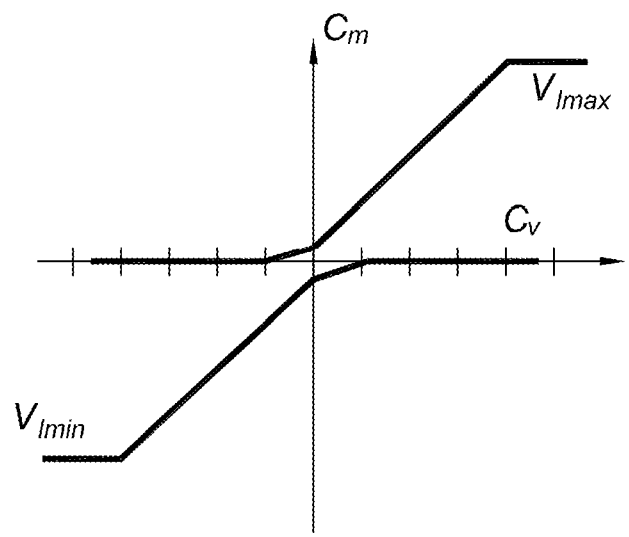
FIG. 2 is a curve representing a maximum limit value and a minimum limit value of a motor torque as a function of a steering wheel torque in normal operation.

The «interlock» type supervising module $M_{sur}$ receives an input signal corresponding to the exerted steering wheel torque $C_v$ and determines a maximum limit value $V_{lmax}$ and a minimum limit value $V_{lmin}$ of a motor torque $C_m$ according to monitoring curves represented in FIG. 2. The maximum limit value $V_{lmax}$ is substantially equal to 0 when the steering wheel torque $C_v$ is negative, then increases linearly to an asymptote. The minimum limit value $V_{lmin}$ is equal to a negative constant on certain negative values of the steering wheel torque $C_v$, then increases linearly so as to be substantially equal to 0 when the steering wheel torque $C_v$ is positive.

Of course, FIG. 2 represents an example which is in no way limiting of a monitoring curve, other forms of monitoring curves can be considered.

Thus, the supervising module $M_{sur}$ bounds the value of the motor torque $C_m$ between the maximum limit value $V_{lmax}$ and the minimum limit value $V_{lmin}$. Furthermore, in the embodiment of FIG. 2, the maximum limit value $V_{lmax}$ being substantially equal to 0 when the steering wheel torque $C_v$ is negative and the minimum limit value $V_{lmin}$ being substantially equal to 0 when the steering wheel torque $C_v$ is positive, the supervising module $M_{sur}$ establishes that the steering wheel torque $C_v$ and the motor torque $C_m$ are in the same direction.

The comparison module MCP receives the maximum limit value $V_{lmax}$, the minimum limit value $V_{lmin}$ and the setpoint motor torque $C_{mc}$ as input. The comparison module MCP compares the setpoint motor torque $C_{mc}$ with the maximum $V_{lmax}$ and minimum $V_{lmin}$ limit values and transmits the applied motor torque $C_{ma}$.

The applied motor torque $C_{ma}$ is equal to the setpoint motor torque $C_{mc}$ as long as the setpoint motor torque $C_{mc}$ is comprised between the maximum $V_{lmaxt}$ and minimum $V_{lmint}$ limit values.

As soon as the setpoint motor torque $C_{mc}$ exceeds a limit value $V_{lmax}$, $V_{lmin}$, the steering computer CD is declared faulty and the applied motor torque $C_{ma}$ is limited to the maximum $V_{lmaxt}$ or minimum $V_{lmint}$ limit values.

Figure 4:
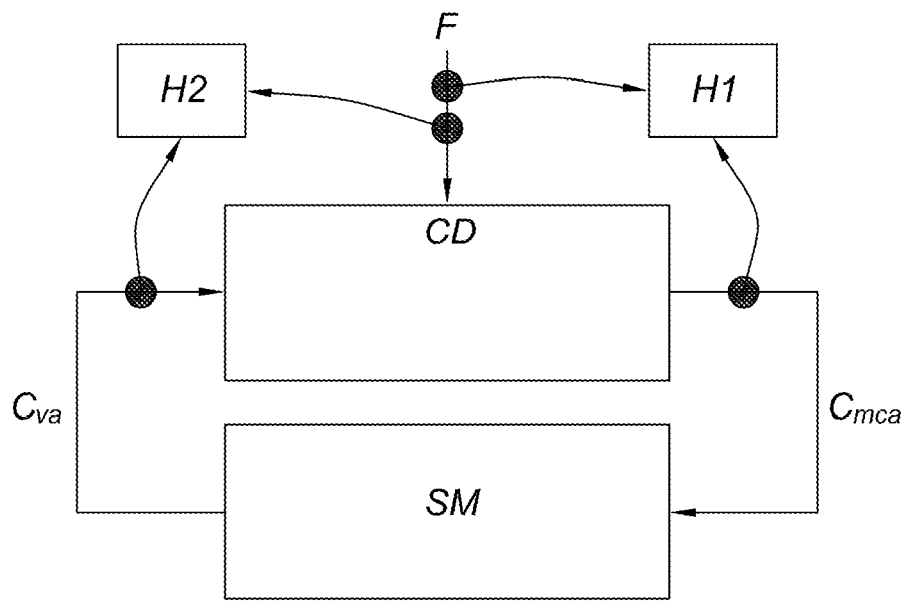
FIG. 4 is a schematic representation of an assisted operation of a power steering.

In assisted operation, an assistance function F is occasionally exerted on the power steering system and more particularly on the steering computer CD as shown in FIG. 4. The assistance functionality F determines an operating point $P_{fa}$ corresponding to an assistance steering wheel torque $C_{va}$ and an assistance setpoint motor torque $C_{mca}$, different from a normal operating point P corresponding to the operating point exerted in a normal situation.

In assisted operation, the steering wheel torque $C_v$ is equal to the assistance steering wheel torque $C_{va}$ and the setpoint motor torque $C_{mc}$ is equal to the assistance setpoint motor torque $C_{mca}$.

Figure 3:
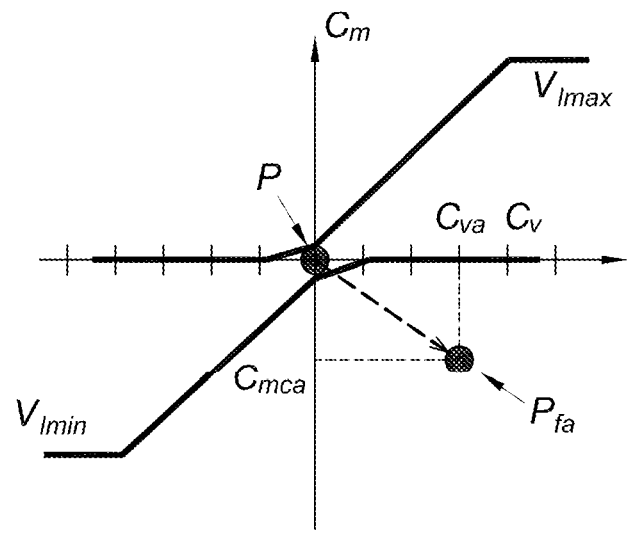
FIG. 3 is a representation of an operating point of an assistance functionality.

In the absence of a method according to the invention, the supervising module $M_{sur}$ receives the value of the assistance steering wheel torque $C_{va}$ and determines maximum $V_{lmax}$ and minimum $V_{lmin}$ limit values associated to this assistance steering wheel torque $C_{va}$ so as to guarantee that the motor torque applied to a value consistent with the assistance steering wheel torque $C_{va}$. However, the assistance setpoint motor torque $C_{mca}$ determined by the assistance function F is not comprised between the monitoring curves of the supervising module $M_{sur}$ as shown in FIG. 3. Thus the comparison module MCP detects a false failure of the steering computer CD and transmits an applied motor torque $C_{ma}$ equal to the minimum limit value $V_{lmin}$.

Figure 5:
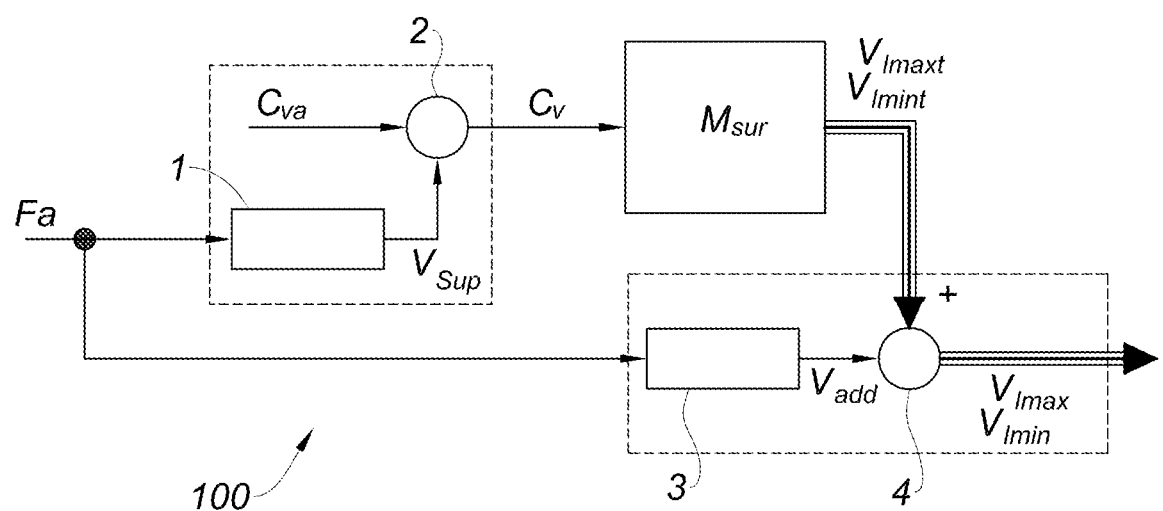
FIG. 5 is a schematic representation of the method according to the invention.

In the method according to the invention 100 as represented in FIG. 5, the supervising module $M_{sur}$ is not affected by an activation of the assistance functionality F.

In the method according to the invention 100, a calculation step 1 determines a supplementary value $V_{supp}$ provided by the assistance functionality F to the assistance steering wheel torque $C_{va}$ relative to the steering wheel torque $C_v$ being exerted in normal situation. The supplementary value $V_{supp}$ is calculated thanks to a second transfer function H2 between the assistance steering wheel torque $C_{va}$ and an assistance function Fa of the assistance functionality F.

The assistance steering wheel torque $C_{va}$ exerted by the assistance functionality F is therefore equal to the sum of the steering wheel torque $C_v$ exerted in normal situation and the supplementary value $V_{supp}$.

During a modification step 2, the method subtracts the supplementary value $V_{supp}$ from the assistance steering wheel torque $C_{va}$. Thus, the modification step 2 emits a signal corresponding to the steering wheel torque $C_v$ in the absence of an assistance functionality F.

The steering wheel torque $C_v$ is the input signal of the supervising module $M_{sur}$. Thus, the signal received by the supervising module $M_{sur}$ always corresponds to the steering wheel torque $C_v$ whether the assistance function F is active or inactive. The supervising module $M_{sur}$ determines, during a determination step, thanks to the monitoring curves, a temporary maximum limit value $V_{lmaxt}$ and a temporary minimum limit value $V_{lmint}$ associated to this steering wheel torque $C_v$. The operation of the supervising module $M_{sur}$ is not influenced by the assistance functionality F.

Furthermore, the method also determines an additional value $V_{add}$ provided by the assistance functionality F to the assistance setpoint motor torque $C_{mca}$ during an estimation step 3. The estimation step 3 implements a first transfer function H1 between the assistance setpoint motor value $C_{mca}$ and the assistance function Fa of the assistance functionality F.

The assistance setpoint motor torque $C_{mca}$ exerted by the assistance functionality F is therefore equal to the sum of the setpoint motor torque $C_{mc}$ exerted in a normal situation and the additional value $V_{add}$.

The influence of the assistance functionality F on the assistance setpoint motor torque $C_{mca}$ is taken into account by the supervising module $M_{sur}$ during a step 4 of correcting the temporary maximum limit value $V_{lmaxt}$ and the temporary minimum limit value $V_{lmint}$. During the correction step 4, the additional value $V_{add}$ is added to each of the maximum $V_{lmaxt}$ and minimum $V_{lmint}$ temporary limit values so as to obtain maximum $V_{lmax}$ and minimum $V_{lmin}$ limit values taking into account the influence of the assistance functionality F.

Thus, the influence of the assistance functionality F is subtracted upstream of the supervising module $M_{sur}$ and the influence of the assistance functionality F is added downstream of the supervising module $M_{sur}$ such that the supervising module $M_{sur}$ is not influenced by the assistance functionality but that the maximum limit value $V_{lmax}$ and the minimum limit value $V_{lmin}$ take into account the influence of the assistance functionality F.

Finally, the comparison module MCP compares the assistance setpoint motor value $C_{mca}$ with the maximum limit value $V_{lmax}$ and the minimum limit value $V_{lmin}$. The comparison module MCP is not influenced by the activation of the assistance functionality F.

Of course, the invention is not limited to the embodiments described and represented in the appended figures. Modifications remain possible, in particular from the point of view of the constitution of the various elements or by substitution of technical equivalents, without departing from the protection field of the invention.

The invention claimed is:

1. A method for supervising the operation of a power steering system comprising a steering wheel, an assist motor and a supervising module wherein it comprises:
   a step of determining at least one temporary limit value of a parameter;
   a step of estimating an additional value provided by an assistance functionality to a setpoint value of the parameter;
   a step of correcting the at least one temporary limit value by the additional value.

2. The method according to claim 1, wherein the determination step defines a temporary maximum limit value and a temporary minimum limit value of the parameter.

3. The method according to claim 1, wherein the estimation step calculates the additional value using a first transfer function between the setpoint value and an assistance function of the assistance functionality.

4. The method according to claim 1, wherein the correction step adds the additional value to a temporary limit value of the parameter.

5. The method according to claim 1, comprising a step of calculating a supplementary value provided by the assistance functionality to a modified input signal of the supervising module.

6. The method according to claim 5, wherein the calculation step determines the supplementary value using a second transfer function between the modified input signal and the assistance function of the assistance functionality.

7. The method according to claim 5, comprising a step of modifying the modified input signal by the supplementary value.

8. The method according to claim 7, wherein the modification step subtracts the supplementary value from the modified input signal.

* * * * *